(12) United States Patent
Caballero et al.

(10) Patent No.: US 11,559,746 B1
(45) Date of Patent: Jan. 24, 2023

(54) FEEDBACK ORIENTED GAMEPLAY SESSIONS IN VIDEO GAMES

(71) Applicant: Electronic Arts Inc., Redwood City, CA (US)

(72) Inventors: Oswaldo Caballero, Menlo Park, CA (US); Paul Main, Irvine, CA (US); Samuel Lam, San Mateo, CA (US); Santiago Velez, Los Angeles, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

(21) Appl. No.: 17/402,424

(22) Filed: Aug. 13, 2021

(51) Int. Cl.
*A63F 13/75* (2014.01)
*A63F 13/79* (2014.01)

(52) U.S. Cl.
CPC .............. *A63F 13/75* (2014.09); *A63F 13/79* (2014.09); *A63F 2300/5546* (2013.01); *A63F 2300/5586* (2013.01)

(58) Field of Classification Search
None
See application file for complete search history.

(56) References Cited

U.S. PATENT DOCUMENTS

| | | | | |
|---|---|---|---|---|
| 2010/0081508 A1* | 4/2010 | Bhogal | .................. | A63F 13/35 463/40 |
| 2021/0370188 A1* | 12/2021 | Thomas | .................. | A63F 13/77 |
| 2022/0032198 A1* | 2/2022 | Orrino | .................. | G06N 20/00 |

* cited by examiner

*Primary Examiner* — Jason T Yen
(74) *Attorney, Agent, or Firm* — Knobbe, Martens, Olson & Bear, LLP

(57) ABSTRACT

Systems and methods are described herein for monitoring a gameplay session for violations of a policy and creating a remediation gameplay session through which remediation can be provided to players or player accounts that violate gameplay policies. The systems and methods can create a remediation gameplay session based in part on the game state data of the gameplay session during which the violation occurs.

20 Claims, 6 Drawing Sheets

US 11,559,746 B1

FEEDBACK ORIENTED GAMEPLAY SESSIONS IN VIDEO GAMES

BACKGROUND

It is optimal and desirable for video games to provide players with constructive feedback to their gameplay. Access to gameplay sessions including feedback that remediates conflicts and misconduct among players (commonly known as "toxicity" or "toxic behavior") can help maintain fair play environments in gameplay sessions. Access to gameplay sessions including strategic feedback can provide analysis of gameplay performance in gameplay sessions. As such, a video game that can create and provide access to feedback oriented gameplay sessions would be advantageous.

SUMMARY

The present disclosure includes a system for providing remediation sessions for violations of a policy, the system including machine-readable instructions that, when executed by the one or more processors, cause the one or more processors to: connect a plurality of player characters to a gameplay session of a video game, wherein the gameplay session comprises game state data; establish a policy, the policy comprising violations of interactivity among the plurality of player characters in the gameplay session, wherein a player account is associated with one or more player characters among the plurality of player characters; monitor interactivity among the plurality of player characters in the gameplay session to detect violations of the policy by one or more of the plurality of player characters; detecting a violation by a first player character, wherein a first player character is associated with the first player account; capture game state data of the gameplay session at a time when the violation occurs and at least one time proximate to when the violation occurs; create remediation state data based in part on the captured game state data; provide, to the first player account, access to a remediation session, wherein the remediation session is a secondary gameplay session of the video game based in part on the remediation state data; and determine completion of the remediation session by the first player account.

BRIEF DESCRIPTION OF THE DRAWINGS

This disclosure will be more fully understood from the following detailed description taken in conjunction with the accompanying drawings, in which.

DETAILED DESCRIPTION

System Overview

Figure 1:
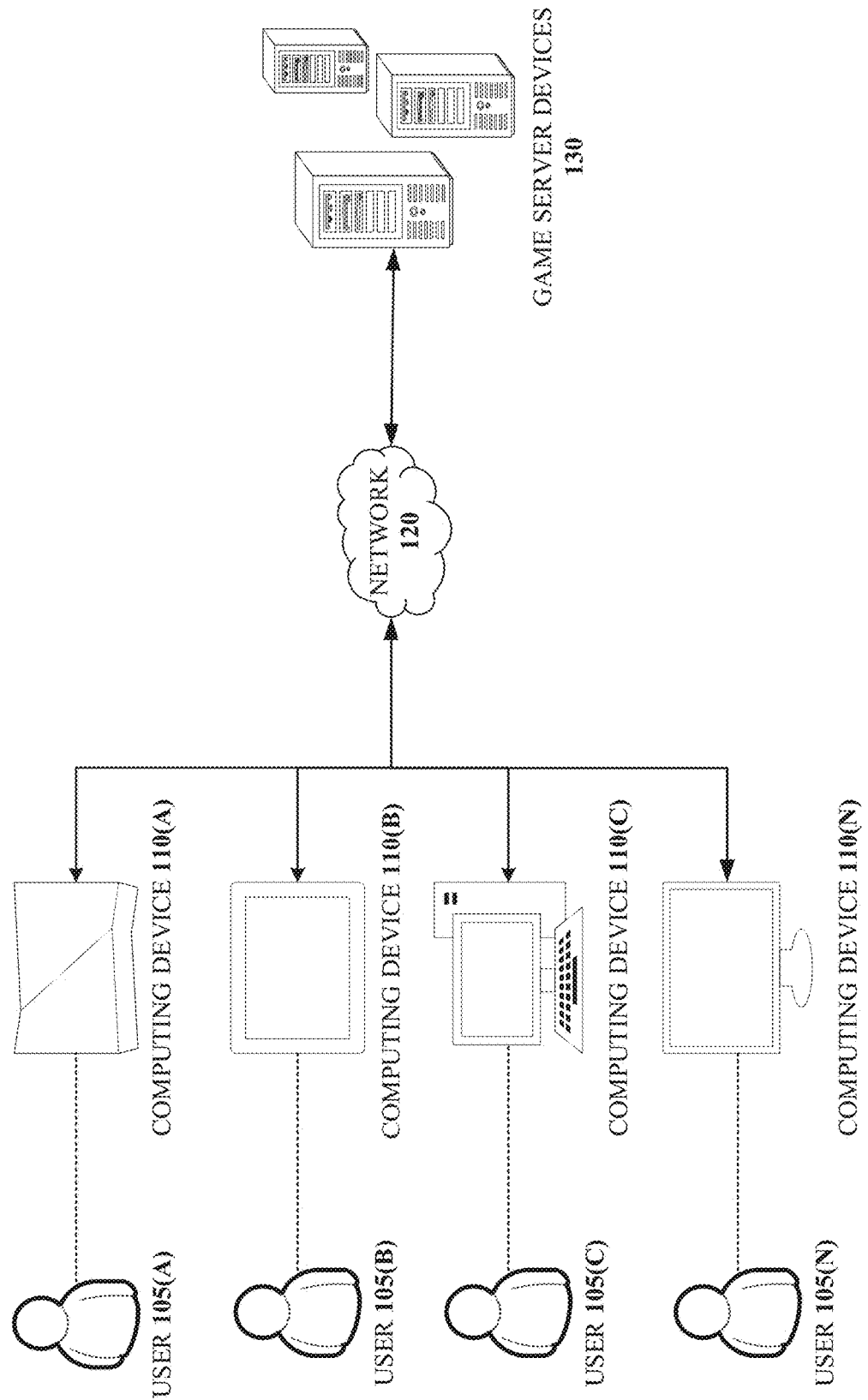
FIG. 1 illustrates an example embodiment of a system overview.

The systems and methods described herein provide for feedback oriented gameplay sessions in video games. Feedback oriented gameplay sessions are a type of gameplay session in a video game that include or convey, for example, constructive feedback through one or more objectives. Feedback oriented gameplay sessions can include: (i) remediation sessions that promote and maintain fair play environments in video games and (ii) advisory sessions that provide interactive strategic analysis of a gameplay session; among other types of feedback oriented gameplay sessions of the like.

To remediate misconduct committed during a gameplay session of a video game, access to a remediation session, or remediation gameplay session, (e.g., a type of gameplay session) can be provided to players. The remediation gameplay session provides remedial strategies as feedback by way of a remediation objective that addresses one or more instances of misconduct, conflict, or other issues of the like, among players of a gameplay session. The remediation objective can provide remedial strategies that are in accordance with, or correspond to, a policy of a video game that is utilized to maintain fair play environments in gameplay sessions. The remediation gameplay session can provide remedial objectives to players that (i) assess the impact the misconduct had during a gameplay session of a video game, and/or (ii) simulate an alternative gameplay scenario without misconduct. The remediation gameplay session of a video game can be created by way of a model or service, or by a player of the video game.

For strategic analysis of gameplay performance in a gameplay session of a video game, access to an advisory session, or advisory gameplay session, (e.g., a type of gameplay session) can be provided to players. An advisory gameplay session of a video game provides gameplay strategies to players by way of an advisory objective that promotes performance improvements for players. The advisory objective can provide advisory objectives to players that (i) assess the gameplay performance of a player during a gameplay session of a video game, and/or (ii) simulate an alternative gameplay scenario with an improved gameplay performance outcome. The advisory gameplay session of a video game can be created by way of a model or service, or by players of the video game.

Other types of feedback oriented gameplay sessions (in short as "feedback gameplay session(s)" or "feedback session(s)") may also be created and provided to players, such as for providing constructive feedback with respect to mediation, conflict resolution, cheating, content creation, community engagement, community outreach, and other game related aspects of the like. Feedback gameplay sessions may be created by one or more models, gameplay services, or gameplay systems of a video game.

Feedback gameplay sessions of a video game, including remediation gameplay sessions and advisory gameplay sessions, can be based in part on a game state, such as a game state of an existing or previously played gameplay session of a video game. Alternatively, feedback gameplay sessions may also be created based in part on new game states from newly created gameplay sessions.

To simplify, but not limit, the disclosure, advisory gameplay sessions and remediation gameplay sessions illustrate the proceeding embodiments of feedback gameplay sessions in a video game.

FIG. 1 illustrates an example embodiment of a system overview 100 of a hardware environment for playing video games. The system overview 100 is an environment including users 105(A), 105(B), 105(C), and 105(D) (collectively referred to herein as "105" or "users 105") of respective computing devices 110(A), 110(B), 110(C), and 110(D)

(collectively referred to herein as "110 or "computing devices 110") that are cumulatively coupled to game server devices 130 over a network 120 for playing a video game. It should be understood that as described in the present disclosure, a "user" on or of a computing device playing a video game refers to or is synonymous with a "player" of the video game.

Users 105 are players of video games on computing devices 110. In some embodiments, there is a one-to-one correspondence between the users 105 and the computing devices 110. In some embodiments, there is an N to one or one to N (wherein "N" is an arbitrary real value) correspondence between the users 105 and the computing devices 110.

Computing devices 110 are exemplary hardware devices capable of playing or executing a video game. As illustrated in the exemplary embodiment of FIG. 1, computing device 110(A) is a video game console for playing a video game; computing device 110(B) is a mobile device for playing a video game; computing device 110(C) is a personal computer for playing a video game; and computing device 110(D) is a display device for playing a video game. In some embodiments, computing devices 110 have dedicated hardware components that can run a video game locally. In some embodiments, computing devices 110 are of similar devices. In some embodiments, computing devices 110 can run video games through a cloud gaming service.

In some embodiments, computing devices 110 are connected to a gameplay session of a video game by way of being communicatively coupled to a game server device 130 over a network 120. Network 120 communicatively couples computing devices 110 and game server devices 130. In some embodiments, a network 120 can be any method of connectivity or communication between devices known in the arts, such as, but not limited to, a direct wired connection, Near Field Communication (NFC), Local Area Network (LAN), an internet connection, or other communication methods of the like.

Game server devices 130 provide the backend infrastructure of services for a video game. In some embodiments, game server devices 130 provide services for video games such as, but not limited to: game platform services, matchmaking, authentication, player account services, fraud detection, policy management, remediation, strategic advising, game state management, datastores, and other video game services of the like.

Gameplay Environment

Figure 2:
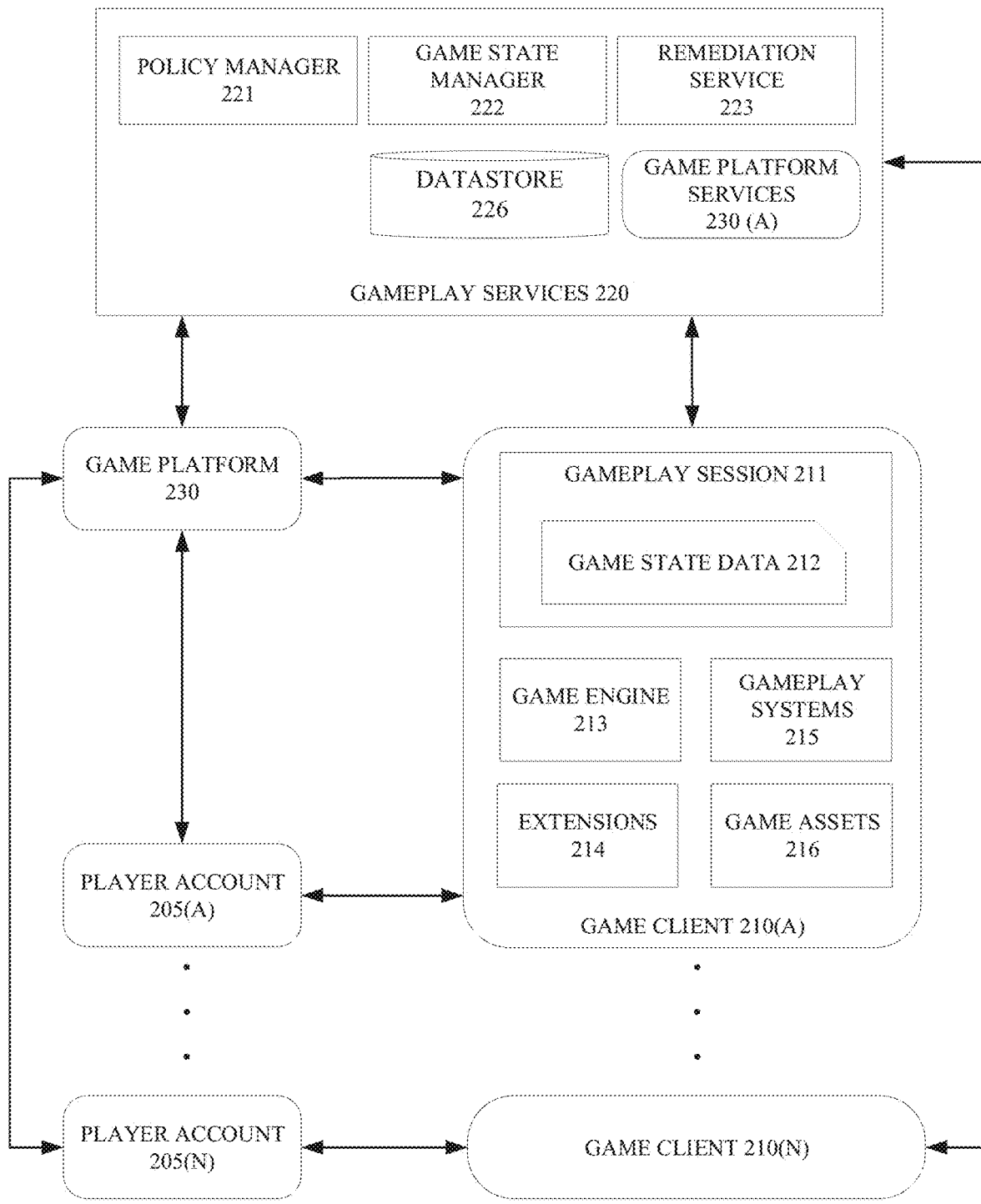
FIG. 2 illustrates an example embodiment of a gameplay session environment.

FIG. 2 illustrates an example embodiment of a gameplay session environment 200. Gameplay session environment 200 is a software environment that includes player accounts 205(A) to 205(N) (collectively referred to as "205") that are associated with game clients 210 (collectively referred to as "210"), and game platform 230. In some embodiments, game clients 210 are communicatively coupled to game platform 230 and gameplay services 220.

Player Account

Player accounts 205 are accounts of players associated with game client 210 and/or game platform 230. In some embodiments, player accounts 205 comprise data provided by players, such as a username, for identifying the player in gameplay sessions of video games associated with game platform 230, such as game client 210. A game client 210 and/or game platform 230 can require users (such as users 105 from FIG. 1) to use a player account 205 to access one or more features of game client 210, such as social gaming features including multiplayer gameplay sessions or player to player communications, in some embodiments. Respectively, data, such as gameplay actions or communications actions, from gameplay sessions of game client 210 can be associated with player accounts 205 in some embodiments.

Game Client

Game clients 210 are software applications of a video game, which can be played through a computing device, such as computing devices 110 of FIG. 1.

In some embodiments, game clients 210 are of the same video game and elements 211, 212, 213, 214, 215, and 216 of game client 210(A) apply through game client 210(N). Game clients 210 may include variations among one another in some embodiments: such as including different software instructions, components, or data for supporting different platforms or performance settings. For example, game client 210(A) and 210(N) can be of the same video game wherein 210(A) includes variations for support on a video game console (such as computing device 110(A) in FIG. 1), while game client 210(N) includes variations for support on a mobile device (such as computing device 110(B) in FIG. 1). However, since 210(A) and 210(N) are of the same video game, both can connect to gameplay session 211 to play together by being communicatively coupled to gameplay services 220.

Gameplay Session

Gameplay session 211 is an instance of a virtual environment of a video game. For example, gameplay session 211 can be a multiplayer match of a video game. In some embodiments, gameplay session 211 is shared among game clients 210 to connect player accounts 205 to gameplay session 211.

A gameplay session 211 may include player characters in some embodiments. Player characters of gameplay session 211 can refer to player controllable character models used to facilitate or perform gameplay or other in-game actions. In some embodiments, a player account 205 of a game client 210 can control one or more player characters in a gameplay session 211.

A gameplay session 211 may include player objects in some embodiments. Player objects of gameplay session 211 can refer to player controllable objects, or models, used to facilitate or enable gameplay or other in-game actions. Player objects may be, for example, vehicles, vessels, aircraft, ships, tiles, cards, dice, pawns, and other in-game items of the like known to those of skill in the art. In some embodiments, a player account 205 of a game client 210 can control one or more player objects in a gameplay session 211, including, in some instances, by controlling player characters.

In some embodiments, the player characters and player objects controlled (and/or manipulated) by a player account 205 during gameplay session 211 can be associated to player account 205. For simplicity, player characters and player objects are collectively referred to herein as player characters in some embodiments.

Gameplay session 211 comprises game state data 212. Game state data 212 can refer to data representing one or more states, in whole or in part, of the gameplay session 211. Game state data 212 may be stored as one or more complementary and/or duplicate files that can be captured and stored locally or remotely on a game server.

In some embodiments, game state data 212 of a gameplay session 211 can include information about, but not limited to: (i) connected player accounts 205 and game clients 210, (ii) player characters associated with player accounts 205, (iii) gameplay actions of player characters, (iv) communication actions associated with player accounts, (v) the status and position of virtual objects and gameplay objectives, (vi) interactions among player characters, and (vii) information about gameplay services 220, among other types of information known to those of skill in the art.

In some embodiments, game state data 212 is one or more data files including text-based information that includes a variety of properties, conditions, statuses, and locations, for instance. An example of game state data 212 and/or a data file with text-based information can be: {TIME=X, PLAYER ACCOUNT=205(A), PLAYER CHARACTER=CHARACTER A, HEALTH=100, ARMOR=0, POSITION=1.0, 2.0, 3.0, WEAPON=NONE, WEAPON ATTACHMENTS=NONE, TEXT CHAT="HELLO", VOICE CHAT=NULL, CURRENT ACTION=EMOTE A, ORIENTATION=NORTH, VELOCITY=1M/S }.

In some embodiments, game state data 212 is a collection of one or more data or log files corresponding to gameplay session 211. For example, game state data 212 can be a collective, in part or in whole, of a number of data or communication logs produced and/or facilitated among one or more game clients 210 and game server 220 that correspond to gameplay session 211.

In some embodiments, game state data 212 is periodically or continuously updated over the course of the gameplay session 211. The gameplay actions of player characters and the communication actions by a player account 205 can produce updates or changes to game state data 212.

For instance, game state data 212 can be updated or changed when the following example gameplay actions of a player character occur: completing an objective or portion thereof; moving from one position of a level to another; eliminating, damaging, or aiding another player character; invoking player character animations (e.g., emotes or crouching); invoking player character voice lines; or directing a ping. In some embodiments, the game state data 212 is updated to include data representative of the gameplay action.

As another example, game state data 212 can be updated or changed when the following example communication actions of a player account occur: communicating text in chat channel of the gameplay session 211, communicating sound in a voice channel of the gameplay session 211, and communicating an image to the gameplay session. In some embodiments, the game state data 212 is updated to include data representative of the conveyed communication.

The game state data 212 of a gameplay session 211 can be captured (e.g., saved). In some embodiments, game clients 210 and/or gameplay services 220 are configured to capture game state data 212 of a gameplay session 211 periodically, continuously, or at or based on the occurrence of some event or trigger. The capture of game state data 212 may be for a predetermined or dynamically determined duration or instance in time, and/or for a duration or instance of time relative to (e.g., prior to, during, after) an event or trigger.

The capturing of game state data 212 allows game clients 210 to reproduce gameplay session 211, or any portion thereof. In some embodiments, gameplay session 211 can be reproduced by way of game client components (e.g., game engine 213, gameplay systems 217, game assets 218, and engine extensions 219) utilizing one or more captures of game state data 212.

In some embodiments, a new game state data based in part on the captures of game state data 212 can be created by gameplay services 220 or game client 210 to produce a new gameplay session. In some embodiments, one or more players 205 connected to gameplay session 211 may create a new game state data based in part on the captures of game state data 212. New game state data for a remediation session can be referred to as remediation state data or remediation game state data. New game state data for an advisory session can be referred to as advisory state data or advisory game state data. As such, a new game state data can be distributed to players (i.e., player accounts 205) to produce (e.g., run the virtual instance thereof) a new gameplay session on game client 210 by way of game client components.

As described in further detail below, the new gameplay session, the new game state data of which can be based in part on captures of game state data during a gameplay session, can be a feedback gameplay session, such as a remediation gameplay session and/or an advisory gameplay session.

Game Client Components

Game client components (e.g., game engine 213, gameplay systems 217, game assets 218, and engine extensions 219) are portions or subparts of, corresponding to and/or associated with game client 210 that provide the underlying frameworks and software that support and facilitate features of the video game.

In some embodiments, a game engine 213 is an underlying software framework that runs a video game. Game engine 213 includes, among other things, renderer, simulator, and stream layer. A renderer is a graphics framework that manages the production of graphics. As used herein in some embodiments, a simulator refers to a framework that manages simulation aspects corresponding to physics and other corresponding mechanics used in part for animations and/or interactions of gameplay objects, entities, characters, lighting, gases, and other game assets or effects of the like. A stream layer is a software layer that allows a renderer and simulator to run independently of each other by providing a common execution stream for graphics and animations to be produced at runtime. In some embodiments a game engine includes an audio engine that synchronizes audio playback with the common execution of a stream layer, or with the simulator directly.

In some embodiments, gameplay systems 215 are used in conjunction with a game engine 213 to facilitate and manage gameplay logic and other features of a game client 210. For example, gameplay systems 215 can be used to manage settings and preferences, and facilitate social features, communications, and gameplay aspects (e.g., control inputs, events, triggers, NPCs, and other functions of the like) of a video game.

Gameplay systems 215 can also include a game state editing system that creates or enables creation of new game state data based in part on captures of game state data from one or more gameplay sessions. The new game state data created by a game state editing system can be utilized by game client 210 to produce a new gameplay session. The new gameplay session produced can be a feedback gameplay session of the video game, such as a remediation gameplay session or advisory gameplay session.

In some embodiments, a game state editing system produces new game state data based in part on captures of game state data 212, based on or by evaluating the gameplay actions and/or communication actions or corresponding to one or more players 205 that participated (e.g., played) in gameplay session 211. The evaluation includes a categorization of gameplay actions and/or communication actions by one or more players to determine a gameplay objective to incorporate into the new game state data.

The type of evaluation performed by the game state editing system can be based in part on the type of feedback gameplay session that is sought or configured to be generated, including for example a remediation gameplay session or an advisory gameplay session. The gameplay objective that is to be incorporated in the new game state data corresponds to the type of feedback gameplay session.

For example, when creating new game state data to produce a remediation gameplay session, the game state editing system can be configured to categorize misconduct among one or more players 205 in the gameplay session 211 from game state data 212. The categorization of misconduct can be based in part on a variety of data or criteria including one or more of, but not limited to: game state data of historical gameplay sessions containing misconduct, a policy corresponding to gameplay session 211 that includes or identifies gameplay actions and/or communications constituting misconduct (or violation of the policy), and player reports of misconduct corresponding to gameplay session 211 or other historical gameplay sessions where similar gameplay actions, communication actions, or other related in-game events occurred.

The categorization of misconduct can then be utilized by the game state editing system to determine an objective that remediates the misconduct. The objective may include an assessment of the misconduct that identifies the impact the misconduct had on gameplay session 211 and/or on one or more players 205. The objective may also require or request interactivity from a player, such that the interactivity demonstrates and/or conveys (i) the impact of the misconduct (e.g., on another player) and/or (ii) an alternative result of the gameplay session.

Similarly, in example of creating new game state data to produce an advisory gameplay session, the game state editing system can be configured to make evaluations of gameplay performance among one or more players 205 in gameplay session 211 from game state data 212. The evaluations of gameplay performance can be based in part on the gameplay actions, telemetry, statistics, and other metrics known to those of skill in the art corresponding to one or more players 205. The evaluations of gameplay performance may also consider skill ratings corresponding to one or more players 205. The criteria or data from which gameplay performance is evaluated (or categorized) from can be based in part on historical game state data from previous gameplay sessions where other players approached the same or similar gameplay situation in a more efficient or effective manner. The criteria can also be based in part on data from an ideal gameplay session simulated by game client 210, where automated character agents complete the same or a similar gameplay situation efficiently and/effectively. Such simulations may be simulated in response to an evaluation of gameplay performance, where no suitable criteria are available for reference (such as among a database corresponding to gameplay services 220).

In such examples, the evaluation itself can be a comparison of the data corresponding to the gameplay performance of a player 205 and that of one or more other players (e.g., from a previous or simulated gameplay session). Based in part on the evaluation, a gameplay objective can be determined. The objective may include an assessment of the gameplay performance that benefited and/or detriment one or more gameplay objectives corresponding to gameplay session 211. The objective may also require or request interactivity from a player, such that the interactivity demonstrates gameplay methods, techniques, or strategies for improvement.

In some embodiments, the game state editing system can be configured to (e.g., as an automated or semi-automated process) produce new game state data in the gameplay environment such as the aforementioned examples.

In some embodiments, game client 210 may provide players 205 with access to the game state editing system to enable players 205 to create partial or complete new game state data based in part on game state data 212 on their own accord. In some embodiments, this user-created new game state data can be combined and/or used in conjunction with computer-generated new game state data.

The game state editing system may be an interactive editor that enables players 205, e.g., through a functional interface, to produce new game state data to create an advisory gameplay session by modifying game state data 212. Such modifications to game state data 212 can include instructions for (i) introducing or removing gameplay events or triggers, (ii) substituting, removing, or adding player characters, such as with automated character agents, (iii) modifying the positions of one or more gameplay objects or player characters, (iv) creating tips, suggestions, notifications, and other markup or identification features that appear as notifications or overlays during runtime of a respective new gameplay session, (v) modifying, removing, or adding gameplay objectives, (vi) modifying, removing, or adding parameters that affect simulation or rendering; and (vii) providing access to other modifiable gameplay features or parameters of the like.

The new game state data produced from the game state editing system can be saved locally to game client 210 or to game server 220. New game state data can be distributed to all or some game clients 210, or to one or more players 205 in particular: such as through peer to peer communication or by way of gameplay services 220. In turn, access to the new game state data enables one or more game clients 210 to locally produce a new gameplay session based in part on the new game state data.

In some embodiments, a game state editing system can create an advisory gameplay session with an advisory objective, based in part on game state data 212. The game state editing system can provide players with functionality similar to traditional game replay systems, such as fast forward, pause, reverse, zooming, and camera or perspective change, to see the entirety of gameplay (including communication actions) occur in detail. The game state editing system can provide players with functionality or inputs to markup and/or provide commentary—in the form of video, audio, text, and other elements, effects, or overlays of the like—on the gameplay actions corresponding to one or more player characters of the original gameplay session 211.

The game state editing system can output or produce advisory game state data, a game state based in part on game state data 212. As such, a player 205 can create an assessment as an advisory objective based in part on the markups and commentary from player 205. Therefore, the advisory gameplay session produced by player 205 can, in essence, coach other players with gameplay strategies illustrated by player 205.

In some embodiments, a game state editing system can create an advisory gameplay session with an advisory objective, based in part on game state data 212, through automation, in whole or in part (e.g., with some player or user input, as aforementioned). The automation can be based in part on a machine learning system that identifies areas or aspects in gameplay performance of one or more players that can be improved upon for a higher likelihood of success. The training or reference data used for automating the game state editing system can be based in part on game state data from gameplay sessions including one or more highly skilled players or automated character agents. The automation can identify instances in the game state data that differ from that of the training data corresponding to a similar gameplay situation(s), such as, for example, the positions of one or more player characters, one or more statuses of one or more player characters, the distance between player characters on the same player team, the time spent advancing one or more gameplay objectives of the gameplay session, among other gameplay data.

For example, where a player has low health at some instance of gameplay session of a first person shooter video game, the system can identify that point in the game state data and generate new state data that includes a generated commentary or overlay advising the player to seek or regenerate health, take cover, and/or retreat. Other, non-limiting, examples of strategic feedback providing in advisory state data for an advisory session include demonstrations and/or illustrations of alternative outcomes in a gameplay scenario, commentary corresponding to an opponent's strategy including one or more visualizations, tips for improving tactics or strategies at one or more instances in a gameplay session, among other feedback of the like.

In some embodiments, the game state editing system generates or creates video or other content of the like that one or more players can engage and/or interact with to receive strategic feedback.

In some embodiments, a game engine 213 and/or gameplay systems 215 references game assets 216 to produce a gameplay session 211. Game assets 216 are digital assets that compose the virtual interactive environments of a game client 210, such as menus and gameplay sessions, which include: game objects, textures, terrain maps, geometry scripts, animation files, audio files, character models, video files, font libraries, visual effects, and other digital assets of video games of the like.

In some embodiments, engine extensions 214 are used in conjunction with a game engine 213. Engine extensions 214 are software components that can support the game engine 213 and gameplay systems 215. For example, engine extensions can include SDKs, APIs, shims, DLLs that provide a variety of functionality such as providing additional graphics, audio, or communication support, establishing, and maintaining service connections, performing authorizations, providing anti-cheat and anti-fraud detection, among other things.

In some embodiments, accessing captures of game state data 212 enables the game client components of a game client 210 to reproduce (e.g., instantiate) one or more states of gameplay session 211, such that it can be replayed, in whole or in part. In further embodiments, accessing new game state data based in part on the captures of game state data 212 enables the game client components of a game client 210 to instantiate a state of a new gameplay session based in part of gameplay session 211, such that gameplay session 211 can be replayed with one or more alterations or modifications (e.g., for remediation purposes).

Gameplay Services

Gameplay services 220 are backend services of a video game. In some embodiments, gameplay services 220 are provided by game server devices 130 s 130 of FIG. 1. In some embodiments, gameplay services 220 include, but are not limited to, a policy manager 221, a game state manager 222, a remediation service 223, a datastore 226, and game platform services 230(A).

Game clients 210 and game platform 230 can communicate with gameplay services 220 over a network, such as network 120 illustrated in FIG. 1. In some embodiments, game services 220 establish and maintain connections for gameplay session 211 among game clients 210 and player accounts 205 to facilitate a multiplayer gameplay for gameplay session 211.

Game platform services 230(A) is a service to game platform 230. In some embodiments, game platform 230 is a software client that utilizes game platform services 230 (A).

Policies

Policy manager 221 is a service that creates and manages fair play policies (also referred to herein as "policy" or "policies") and monitors for the compliance thereof within a video game; such as within gameplay session 211.

A policy is a set of rules used, in part or in whole, to detect, determine, identify, and/or categorize misconduct in a video game. The rules of the policy can be based in part on standards of conduct set by developers of a video game, historical incidents of misconduct, and player misconduct reports, among other things.

In some embodiments, a policy can include gameplay actions, communication actions, and other game related actions of the like that do, and/or do not, constitute misconduct. For purposes of this disclosure, the occurrence of misconduct by one or more players of a video game, as defined (directly or indirectly) by a policy, is known as a violation of a policy (or "violation" in short).

A policy can include a number of actions constituting misconduct, including, but not limited to: performing repetitive gameplay actions; performing repetitive communication actions; conveying and/or directing abusive communications; creating, distributing, and/or displaying abusive user generated content; gameplay inaction; gameplay actions that hinder a player's respective player team in a team based gameplay session of a video game; gameplay actions that are modified, controlled, directed, or assisted by software (i.e., cheating software), receiving player metrics, statistics, telemetry, and other data relating to the game state or gameplay session from software (i.e., cheating software); receiving player metrics, statistics, telemetry, and other data relating to the game state or gameplay session from other players or spectators of a gameplay session (i.e., collusion or "stream sniping").

In some embodiments, policy manager 221 can create and/or manage one or more policies for the video game of game client 210. In some embodiments, policy manager 221 can create and/or manage one or more policies for each gameplay session of the video game, such as gameplay session 211.

In further embodiments, the policy manager 221 creates one or more policies based in part on the player accounts connected to a gameplay session. To illustrate, one or more preferences of a player account can indicate whether certain gameplay actions or communication actions in gameplay session 211 are appropriate or within certain appropriateness boundaries as defined by that respective player. When game services 220 is establishing gameplay session 211 among game clients 210, the policy manager 221 can create a policy that conforms to the preferences of the player accounts 205. For example, if all but one player account 205 in gameplay session 211 finds cursing appropriate, policy manager 221 can establish a policy for gameplay session 211 that makes cursing over a voice channel misconduct. In some embodiments a policy applying to gameplay session 211 is presented to player accounts 205 upon connecting for gameplay.

In some embodiments, the policy manager 221 can create policies through a machine learning model. In such embodiments, the model can utilize rule-based machine learning (RBML) methods to train a network that receives, as input, one or more parameters from player account preferences or historical data, among other things. Based on this data, the policy manager can employ its ML (machine learning) capabilities to traverse through rules, or groups of rules, in the network, to arrive at or create a set of one or more rules to incorporate into a policy for a gameplay session, such as gameplay session 211.

In some embodiments, the policy manager 221 can create policies through a deterministic logic system. A deterministic logic system can determine which rules to apply based directly in part on player accounts preferences, among other things, such that, for example, preference A leads to the selection of rule A for the policy. In some embodiments, the policy manager 221 can use different methods to create, define or select different rules within a single policy. For example, a policy can include a rule created using ML, another can be input directly into the system by another system or person, and yet another rule can be created using deterministic logic.

In some embodiments, the policy manager 221 can consider other data or characteristics of gameplay aspects and/or configurations when selecting one or more rules for a policy. For example, if a player account 205 initiating gameplay session 211 does so with a "mature" rating, the policy manager 221 may create a rule set that no longer classifies one or more types of conduct as misconduct. In further embodiments, the policy manager 221 may be configured with a single policy to apply to all gameplay sessions of a video game, such as game client 210.

Policies created by policy manager 221 can be saved, for example, to the datastore 226 of gameplay services 220. In other embodiments, a policy, or a reference to a policy, can be saved within the game state data 212 of gameplay session 211.

In some embodiment, policy manager 221 can monitor gameplay session 211 indirectly through instructions provided to game client 210. The policy manager 221 can provide game client 210 instructions to invoke one or more components of either gameplay systems 215 or extensions 214 that enable game client 210 to locally monitor gameplay session 211 for a violation of a policy. The instructions provided by policy manager 221 can include the policy, and rules thereof, for a component of game client 210 to detect a violation of the policy.

The instructions can further provide instructions for game client 210 to capture game state data 212, in whole or in part, when the violation occurs and/or at least one time proximate to (and/or including) when the violation occurred, or for the duration of the gameplay session. When capturing game state data 212, game client 210 can store the capture locally on the storage of a respective computing device and/or send the capture to datastore 226 of gameplay services 220.

In some embodiments, policy manager 221 can monitor gameplay session 211 directly through the game state manager 222 of gameplay services 220. The policy manager 221 includes instructions for monitoring the game state data processed by game state manager 222 to detect a violation of the policy.

A game state manager 222 is a service that manages and/or facilitates the game state data of a gameplay session. In some embodiments, game state manager 222 is authoritative, such that it determines what the current state of gameplay session 211 is and provides updates of game state data 212 to game clients 210. In some embodiments, game state manager 222 is passive, such that the current state of gameplay session 211 is determined by one or more of the game clients 210.

The detection of a violation, by the policy manager 221 and/or the game client 210, can be performed by a model, or a deterministic logic system, with training data (or sample or reference data) corresponding to or indicative of prior occurrences of misconduct. As described in further detail below, this training data enables a system to distinguish (or reduce the complexities of distinguishing) misconduct from (1) other incidental, accidental, or unintentional gameplay or communication actions by players of a video game, and/or (2) actions of unskilled players who do not know how or are unable to play a game well, or players who have difficulty playing a video game for a number of reasons, among other quasi-quantifiable gameplay data. In some embodiments, training data can be supplemented with, derived from, or based in part on, misconduct reported by players. It should be understood that, as used with reference to at least the interactive reporting system, "misconduct" can refer to an actual occurrence of misconduct, or a potential, alleged or suspected occurrence of misconduct. In some embodiments, misconduct can be reported using an interactive reporting system. An interactive reporting system refers to a virtual interactive environment within game client 210 that enables a player to go back into a gameplay session (e.g., as a replay including video, audio and/or text) to review and indicate one or more occurrences of misconduct (e.g., violation of a policy). This can be achieved through the game client 210 and/or game server 220, which can be configured to capture the game state of a gameplay session, in whole or in part, and thereby enable players to review the gameplay session with or through the interactive reporting system.

The interactive reporting system can provide players with functionality similar and/or supplemental to traditional game replay systems, such as fast forward, pause, reverse, zooming, and camera or perspective change, to see the entirety of gameplay (including communication actions) in detail. Additionally, an interactive reporting system can provide players with functionality to indicate or markup gameplay actions or communication actions corresponding to one or more players—for instance, denoting specifically where, how, what, and when misconduct or potential misconduct occurred. The indication of misconduct can also include labeling or a short description of the misconduct, provided by players. Such an interactive reporting system can be a system among the gameplay systems 215.

In this way, a player (e.g., player 205) can replay gameplay session 211 through the interactive reporting system using a capture of game state 212. Player 205 can then indicate a specific occurrence of misconduct in gameplay session 211, such as abusive communication, gameplay inaction, cheating, or other misconduct known to those of skill in the art. For example, the player 205 can indicate that another player is "throwing" (a colloquial idiom among video game communities denoting intentional inaction or action that results in an intentional failure to complete a gameplay objective of a gameplay session) in gameplay session 211. Player 205 can explain (e.g., label or provide a description) how they believe the other player was "throwing" (or "threw") the match by detailing what gameplay actions and/or communication actions correspond to or evidence the act of "throwing." It should be understood that an indication of misconduct can correspond to one or more frames, gameplay actions, communication actions, or player characters of the replay of gameplay session 211.

The detailed indication provided by a player in the interactive reporting system can provide additional context and supplement gameplay data (e.g., game state data) from gameplay sessions which can be used to identify types of misconduct that are harder to detect, such as "throwing." In some instances, a system using training data only may lack enough context to make an adequate or accurate determination of whether certain actions constitute misconduct. This can occur, for example, when an inexperienced player lacks sufficient gameplay experience to make and carry out effective gameplay strategies during gameplay (such as a player who is unfamiliar with the controls of the video game), the abilities of playable characters or non-playable characters (NPCs) in a video game, the layout of a particular map, and the like is likely to play in a manner that is or could be detrimental to the completion of a gameplay objective of a gameplay session. Without further context—e.g., provided through the interactive reporting system—this type of conduct could be misinterpreted or flagged as an occurrence of misconduct such as "throwing."

For example, if the player 205 indicates or reports that another player stated "JUST GONNA THROW, LOL" in the text chat after intentionally repeating emote actions directly in front of the enemy player team in order to be easily eliminated, that information provides context relevant to the act or determination of throwing. The system could therefore distinguish between instances in which a player accidentally performed an emote action in front of an enemy and was unintentionally eliminated thereafter, and when a player intentionally performs an emote action and does not realize the enemy player team could see them, incidentally, making themselves vulnerable. As another example, a player with a disability may not play a video game in the same way as other players, which may lead to misinterpretation of misconduct. Therefore, factors including a player's overall engagement with the video game, hardware associated with assisting an impairment, the enablement of accessibility settings, and/or player account information, among other things, may be used to supplement the analysis of the detection system to determine if whether certain conduct from one or more particular players should not be considered misconduct.

Such reports made by players in the interactive reporting system can be used to create or supplement the training data or reference data to use when monitoring gameplay sessions to detect violations of a policy. For example, the reports by players and data from the game state of a respective gameplay session can be used in part for the following: training or reference data for a violation or misconduct detection system based in part on machine learning and/or deterministic logic, or a database of misconduct in gameplay sessions, among other things.

A system to detect misconduct, or violations of a policy, within game client 210 or policy manager 221, may be based in part on machine learning or deterministic logic (e.g., a deterministic algorithm). A machine learning implementation can be trained and configured to analyze data and create a result based in part on inference. A deterministic logic implementation can be configured to process data to achieve a predefined or expected output. One skilled in the art would recognize that either aforementioned implementation can be configured to produce similar results.

In some embodiments, the violation detection system within game client 210 or policy manager 221 can receive data including player reports and game state data corresponding to the player report as training or reference data. When evaluating or processing the game state data of a gameplay session, the violation detection system can make a determination or inference based in part on that training or reference data. For example, in a machine learning implementation, the training data (e.g., player reports and game state data corresponding to the player report) provides the system with a more contextual understanding of gameplay, such that the system can better or more accurately detect when misconduct occurs, based in part on when players have indicated that it has occurred in similar situations. As such, the prior reports by players can constitute a foundation or basis for detecting similar misconduct in future or proceeding gameplay sessions.

The detections by a violation detection system within game client 210 or policy manager 221 can be based in part on comparisons between a given game state of a gameplay session and the training or reference data (e.g., from players' reports) and game state data corresponding to those reports. When the game state data of a gameplay session corresponds to one or more prior instances of misconduct among the training or reference data, the game state data can be flagged, marked, or otherwise indicated as including misconduct or being in violation of one or more policies corresponding to the gameplay session.

In some embodiments, the violation detected may also be identified, defined, or otherwise categorized (e.g., by the violation detection system within game client 210 or policy manager 221) as being of one or more types of violations. The categorization of the violation provided may be based in part on the categorization of the misconduct in the training or reference data that was used to detect the violation. For example, training data can include one or more player reports for hate speech and corresponding game state data. The game state data, or the player report, can include a text chat log that includes the language identified as hate speech. As such, the game state of another gameplay session that is determined to correspond to that type of violation can also be categorized as hate speech.

In some embodiments, further or more detailed categorizations, or sub categorizations, of the violations can be determined. For example, the training data can be identified as a particular type of hate speech based in part on data from player reports or contextual analysis. Such embodiments can provide categorizations that identify one or more particular players, individuals, or groups of individuals as targeted victims or subjects of the hate speech. This in turn can provide for more accurate detections and categorizations of misconduct, which can also be used in part for the creation of a remediation gameplay session as explained in further detail below.

In some embodiments, when a violation is detected (e.g., by either policy manager 221 or game client 210), the policy manager 221 can sanction a player account. In some embodiments, a policy manager 221 can make a determination whether to sanction a player account and a determination of the extent of the sanction, based in part on the severity of the violation (such as the type of misconduct that occurred) and/or a history of violations associated with the player account, among other factors.

In some embodiments, a sanction includes an imposed condition which, when completed, can remove the sanction from the player account. For example, a sanction on player accounts may prevent the player account from joining one or more types of gameplay sessions for a duration of time; and upon the completion of the duration of time, the player account may be allowed to proceed to access those one more gameplay sessions again.

In some embodiments, policy manager 221 communicates information about the violation, including: the player account(s) associated with the violation, the type of violation(s) that occurred, and/or the locations of the respective capture(s) of game state data 212 within datastore 226, to remediation service 223.

Remediation Service

A remediation service 223 is a service that can create remediation game state data based in part on the communicated (i.e., detected) violations and captured game state data 212. That is, the remediation game state data can be a new set of game state data, based on or including all or portions of the game state data, for other purposes such as remediation. Remediation game state data includes a remediation objective through which a violation detected in the game state data 212 of gameplay session 211 can be remediated.

In some embodiments, a remediation objective can include (or be based on or associated with) an assessment that evaluates and communicates the impact the violation had (or is presumed to have had) on other players of the gameplay session, and on the outcome of the gameplay of that session. An assessment may be presented in the form of an interactive guide that navigates through specific instances of the game with one or more notifications, a video with one or more notifications, or a set of images from gameplay with one or more notifications, in some embodiments.

In some embodiments, a remediation objective is an alternative gameplay scenario that enables the violating player account to review and reflect on the misconduct through gameplay, or other interactions. In some embodiments, the player can experience or be exposed to the impact of the violation from another perspective. For example, in a remediation gameplay session, a player may play as the player character of the player account they directed misconduct towards. Alternatively, in a remediation gameplay session, a player may play as a player character who was not associated with the misconduct.

An alternative gameplay scenario can be achieved as a remediation objective by reproducing and/or recreating all or portions of the gameplay session. An alternative gameplay scenario can include the ability to play alongside one or more player characters from the gameplay session. In some embodiments, the remediation objective includes both an assessment and alternative gameplay scenario.

In some embodiments, remediation service 223 can determine which type of remediation objective should be included in a remediation gameplay session, such as through a deterministic logic system. The remediation service 223 can evaluate information of the detected violation and/or the player account that committed the violation against a set of criteria, or factors, for the selection of a remediation objective. The factors or criteria may include, for example, the history of violations committed by the player account, the type of violation identified, the amount and context of misconduct reports submitted against the player account for violation, among other things. For example, if the violation was minor, but has been a recurring violation committed by the player account, then the system can determine that the violation sufficiently meets the criteria for providing an assessment of the violation.

In some embodiments, the remediation service 223 can create remediation game state data by way of a machine learning model. A machine learning model, such as recurrent neural network model, can process information (e.g., text data) from the captures of game state data 212 and corresponding detections of violations. The processing of the model can occur in relation to (e.g., weighted against) information about the violation provided by the policy manager 221, misconduct reports, and/or the remediation objective determined.

As a result of the processing, the model can produce new information (e.g., text data) to create remediation game state data. In some embodiments, remediation game state data includes at least one or more portions of one or more captures of game state data 212 and new information (e.g., text data) produced by or based on a machine learning model. Additionally, the model can determine which portions of the gameplay session are relevant to the violation, such that only particular instances within the gameplay session are incorporated as part of a remediation session.

For example, the model can determine that player account 205(N) was not actively participating in gameplay session 211, which potentially led player account 205(A) to commit a violation, e.g., over text chat, directed at player 205(N). Based on this, the model can create new data (e.g., text data) corresponding to a remediation objective to incorporate into remediation game state data. The new text data that can indicate when and how a remediation objective is to occur or be implemented in the remediation gameplay session. For example, for an assessment of the violation included in the remediation objective, the new data can provide context for when and what to display or communicate as a notification (e.g., "NOTIFICATION {"REMEDIAL TEXT", TIME, DURATION, LOCATION, SIZE}").

As another example, where the remediation objective is a gameplay scenario, the model can also determine which player accounts and/or player characters are relevant to the violation and/or which player accounts are necessary or optimal to provide the adequate or desired remediation. In some instances, the player characters that are relevant to the violation and/or needed to provide the remediation can be a subset of the total number of player characters in the gameplay session where the violation occurred. In such cases, only that subset of player characters could be included as part of the remediation session.

The subset of players determined can be identified as new text data that the model provides, such as, for example "PLAYER SUBSET {PLAYER ACCOUNT 205(A) =PLAYER CHARACTER A, PLAYER ACCOUNT 205(B) =PLAYER CHARACTER B, PLAYER ACCOUNT 205(N) =PLAYER CHARACTER N}. In some embodiments, the system and/or model can determine that one or more of the players in the gameplay session can be substituted by one or more automated character agents incorporated into the remediation session; such that gameplay within the remediation session can be driven or directed automatically by the character agents without the need to connect one or more player accounts to those player characters.

In some embodiments, remediation game state data is a combination of captures from game state data 212 and new data appended to the captures as discussed above in further detail. The remediation game state data can replace or substitute the captures of game state data 212. In some embodiments, remediation game state data is a modification of the captures of game state data 212. Remediation game state data can be created locally on game client 210 by way of instructions containing the new data (e.g., remediation objective) that is used in conjunction with the original captures of game state data 212, such that the captures of game state data 212 can be reproduced on game client 210 but modified based on the instructions containing the new data.

In some embodiments, remediation game state data can be configured with instructions perform one or more of the following changes, modifications, or alterations at one or more times, or instances, of a remediation objective to emphasize the impact of the misconduct: increasing or decreasing the FOV, changing the color scheme (e.g., full color to monochrome) of the rendering (i.e., the displayed frames), shrinking the size of the current player character, blurring the rendering, reducing the lighting (i.e., luminosity) of the rendered scene of the remediation session, disabling one or more gameplay actions for the player character, increasing or decreasing one or more audio tracks on one or more audio channels, playing additional audio tracks, increasing the game difficulty, enlarging the size of the current game level (i.e., the map or virtual interactive environment of the gameplay session), among other things.

In some embodiments, the remediation service 223 saves remediation game state data in datastore 226. In some embodiments, remediation service 223 provides the player account(s) associated with the violation with the remediation game state data to provide access to the remediation game session.

To illustrate an embodiment of a process for creating a remediation session, a policy, from policy manager 221, applies to gameplay session 211 and provides that "throwing" is a violation. Thereafter the policy manager 221 or game client 210 may detect that a player character associated with player account 205(A) is determined to be "throwing" in the gameplay session 211—in violation of the policy. The policy manager 221 instructs the game state manager 222 or game client 210 to capture game state data 212 at the time the "throwing" violation occurs and at least one time proximate to it. The policy manager 221 provides the remediation service 223 with information corresponding to the violation detected, and the captured game state data 212 (or a reference thereto). The remediation service 223 can then create a remediation game state data based in part on the captures of game state data 212 and the violation detected. Thereafter, the remediation service 223 can provide player account 205(A) with access to the remediation game state data to produce a remediation session, by way of the game client components (213, 214, 215, and 216)

Remediation Session

Figure 3:
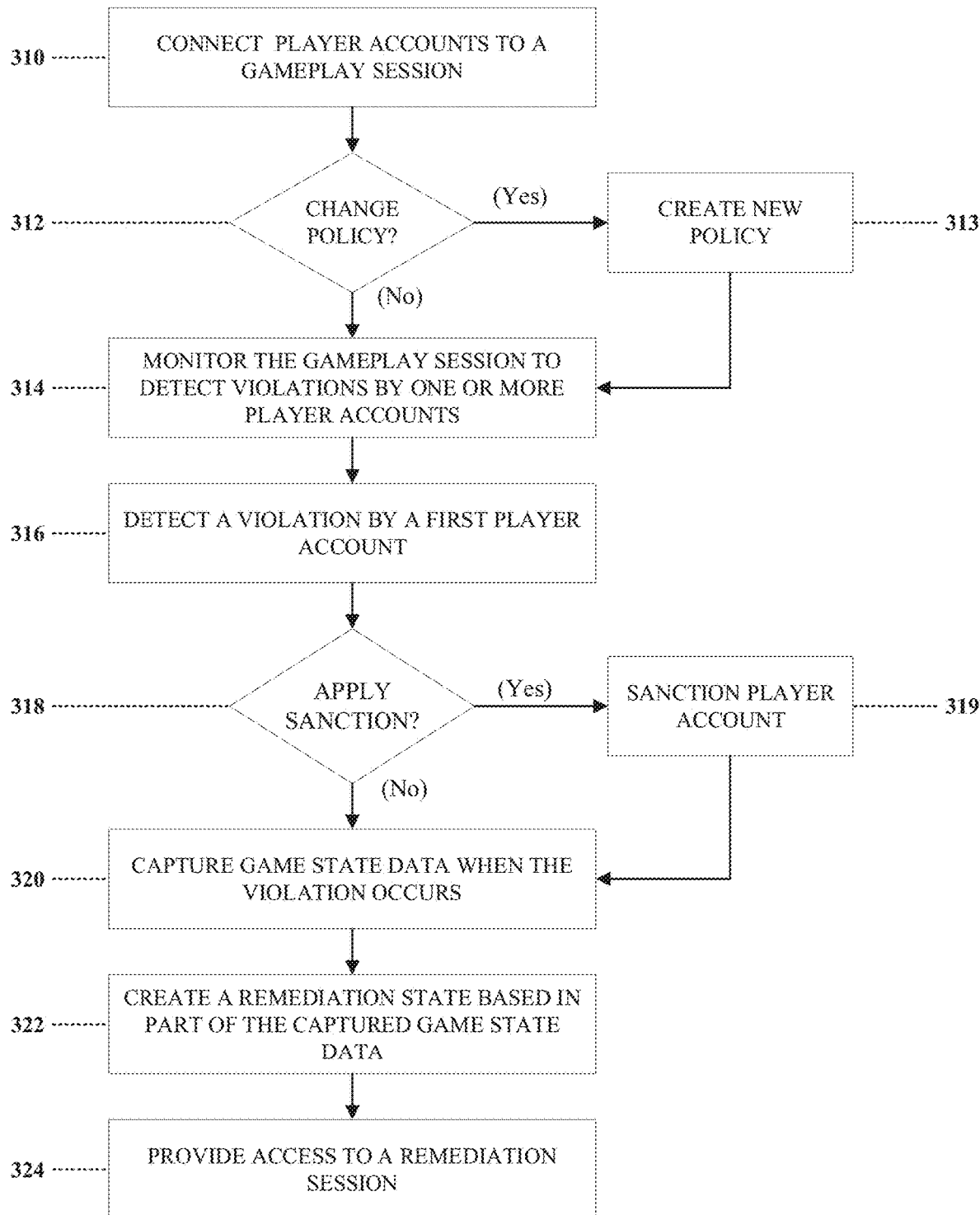
FIG. 3 illustrates an example embodiment of a system process for creating remediation sessions.

FIG. 3 illustrates an example embodiment of a process for creating remediation sessions 300.

Creation Process

At step 310, a number of player characters associated with player accounts are connected to a gameplay session: for example, player accounts 205(A) to 205(N) and gameplay session 211 in FIG. 2.

At step 312, a determination is made as to whether a policy for the gameplay session needs to be established, or to change or be changed. This can be determined by the policy manager 221 as described above with reference to FIG. 2. If so (Yes), at step 313, a new policy is established or created, for instance to conform to or account for the preferences of the connected player accounts. Alternatively, if it is determined at step 312 that the policy does not need to be changed (No), an existing policy that has already been established or created can be applied to the gameplay session.

In turn, at step 314, the system monitors the gameplay sessions to detect violations of the policy by one or more player characters associated with player accounts. As described above with reference to FIG. 2, such monitoring can be performed by the policy manager 221. At step 316, violation(s) of the policy by one or more player characters associated with player accounts are detected. This can be done by the policy manager 221, e.g., as described above with reference to FIG. 2.

At step 318, a determination of whether to apply a sanction to a player account is made, such as by the policy manager 221 as described above with reference to FIG. 2. If it is determined at step 318 that a sanction is to be applied (Yes), the sanctioning of one or more player accounts in violation of the policy is performed at step 319. In some embodiments, where more than one player account is involved in a sanction, the policy manager 221 can provide individualized sanctions to each player account. On the other hand, if it is determined that a sanction is not to be applied at step 318 (No), or after player accounts are sanctioned at step 319, game state data is in turn captured at step 320.

That is, at step 320, the system can capture game state data when the violation occurs—similar to the captures of game state data 212 described for FIG. 2.

In turn, at step 322, the system creates a remediation game state based in part on one or more captures of game state data, such as by remediation service 223 as described in FIG. 2. In some embodiments, a unique remediation game state is created for each of the one or more player accounts associated with the violation.

At step 324, the system provides access to a remediation session to one or more player accounts, such as those associated with the violation. This can be done, for example, by the remediation service 223 as described in FIG. 2.

Accessing the Remediation Session

Figure 4:
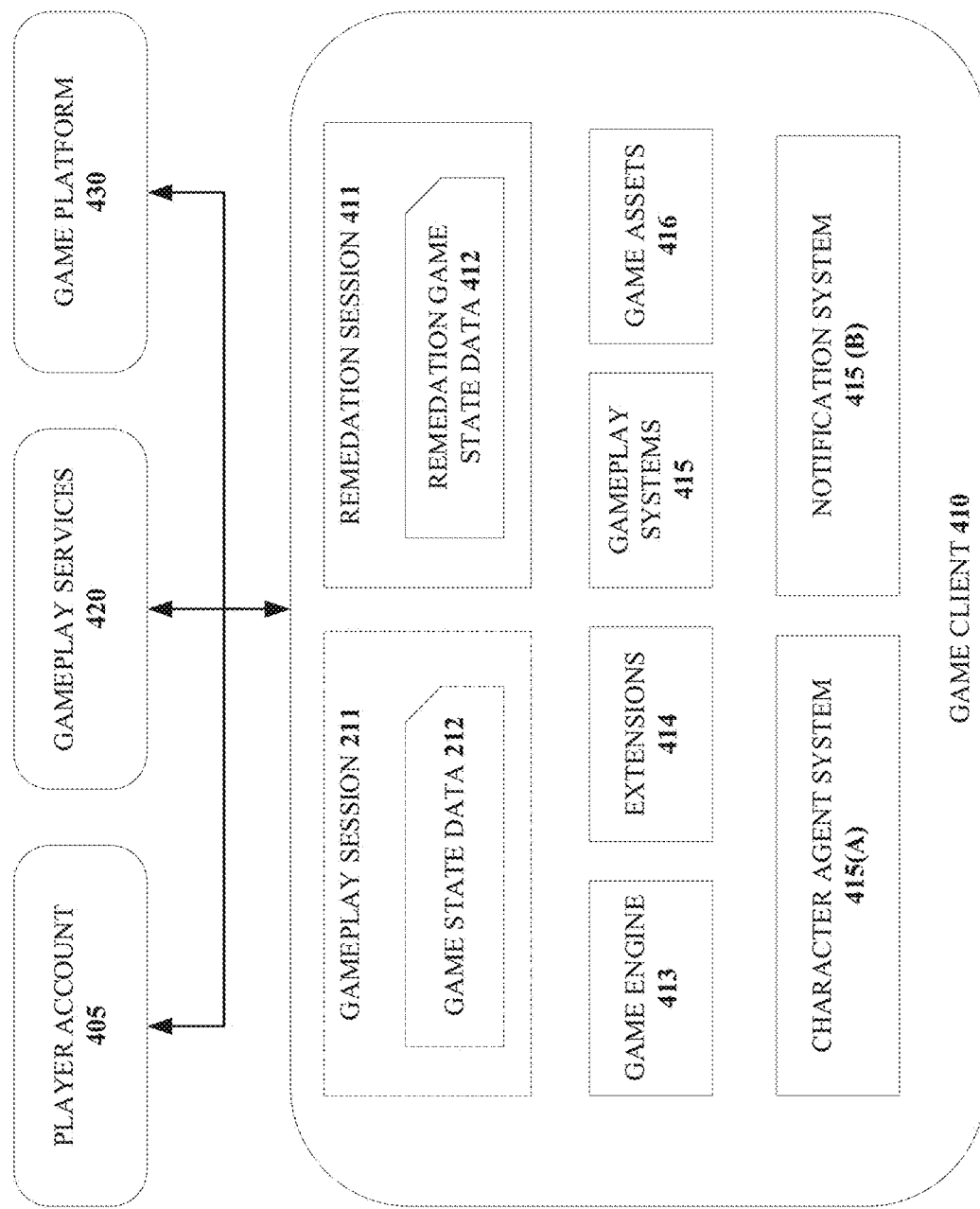
FIG. 4 illustrates an example embodiment for a remediation session environment.

FIG. 4 illustrates an example embodiment for a remediation session environment 400. In some embodiments, player account 405 is similar to player accounts 205 described in FIG. 2; game client 410 and game client components 413, 414, 415, 416 are similar to the game clients 210 and game client components 213, 214, 215, and 216 described in FIG. 2; gameplay services 420 is similar to gameplay services 220 described in FIG. 2; and game platform 430 is similar to game platform 230 described in FIG. 2.

In some embodiments, gameplay services 420 can provide player account 405 access to remediation session 411 through game client 410 by providing remediation game state data 412 to game client 410. Providing game client 410 with remediation game state data 412 can enable game client 410 to present a notification indicating that remediation 411 is now accessible.

In some embodiments, game engine 413, extensions 414, gameplay systems 415, and game assets 416 can read remediation game state data 412 to produce remediation session 411 on game client 410.

In some embodiments, remediation game state data 412 may include data for the use of one or more automated character agents in remediation session 411. An automated character agent can be, in some embodiments, the logic that drives, directs, or controls a player character (e.g., a playable or player controlled character model) in a gameplay session of a video game. Additionally, an automated character agent can include, in some embodiments, a separate, distinct, and/or unique character model that is configured differently than a player controlled character model. For example, an automated character agent including a character model may be configured to perform actions that are not traditionally be included in the configuration of a player controlled character model, such as, a ray casting system and image capture system for determining position and future gameplay actions, among other things. In some embodiments, an automated character agent not including a character model can be configured to provide a new configuration to a player controllable character model such that it can perform the aforementioned actions, among other things.

In some embodiments, character agent system 415(A) is a subcomponent of gameplay systems 415 configured to provide and/or direct one or more automated character agents in remediation session 411. In some embodiments, character agent system 415(A) can be a service among gameplay services 420 that is configured to provide and/or direct one or more automated character agents in remediation session 411.

An automated character agent may be a machine learning agent trained in gameplay. In some embodiments, the gameplay actions of automated characters agents can be modeled on particular players. For example, where players opt into contributing their gameplay data to train an automated character agent, the corresponding automated character agent trained from their control inputs and gameplay data to reflect the player account's gameplay style, such as by way of the systems and methods disclosed in U.S. Pat. No. 10,940,393 and U.S. Pat. No. 10,839,215 which are incorporated by reference in their entirety. As such, in some instances, where player accounts elect to contribute their gameplay data for training, a particular character agent that is representative of their gameplay style can be used. As another example, automated character agents can be based in part on one or more people represented in the game as a player character, such as by way of the systems and methods disclosed in U.S. Pat. No. 10,713,543, which is incorporated by reference in its entirety.

Alternatively, an automated character agent may comprise traditional "artificial intelligence" for controlling a player character, as one skilled in the art would recognize.

In some embodiments, the character agent system 415(A) includes character agents configured to drive or direct the alternative gameplay scenario of remediation session 411. For example, remediation game state data 412 includes an alternative gameplay scenario as a remediation objective in which the gameplay session results in a win rather than a previous loss. The character agent system 415(A) can provide automated character agents configured to best achieve a "win" from any given state (e.g., game state data) of a gameplay session, such that the character agents themselves can drive gameplay towards a win from any particular game state that remediation game state data 412 is based on. In some embodiments, the automated character agents may also be configured to conform to a stand of conduct, or gameplay style, that best promotes a remedial gameplay strategy provided in the remediation game state data 412.

In some embodiments, remediation game state data 412 may include one or more notifications that provide remedial gameplay strategies at one or more times during the remediation session 411 which can be read by, or passed to, notification system 415(B). In some embodiments, notification system 415(B) is a subcomponent of gameplay systems 415 configured to display notifications provided within remediation game state data 412.

The game client 410 can include gameplay session 211 and game state data 212. The remediation session 411 can occur during gameplay session 211, such that remediation session 411 is a sub session of gameplay session 211.

In some embodiments, game client 410 is separate and distinct from game client 210, such that a remediation session can occur externally from the original game client in which the violation occurred and was detected on.

In some embodiments, gameplay systems 415 can be configured to remove a sanction on player account 405 upon completion of the remediation objective of remediation session 411.

Remediation Objective

Figure 5:
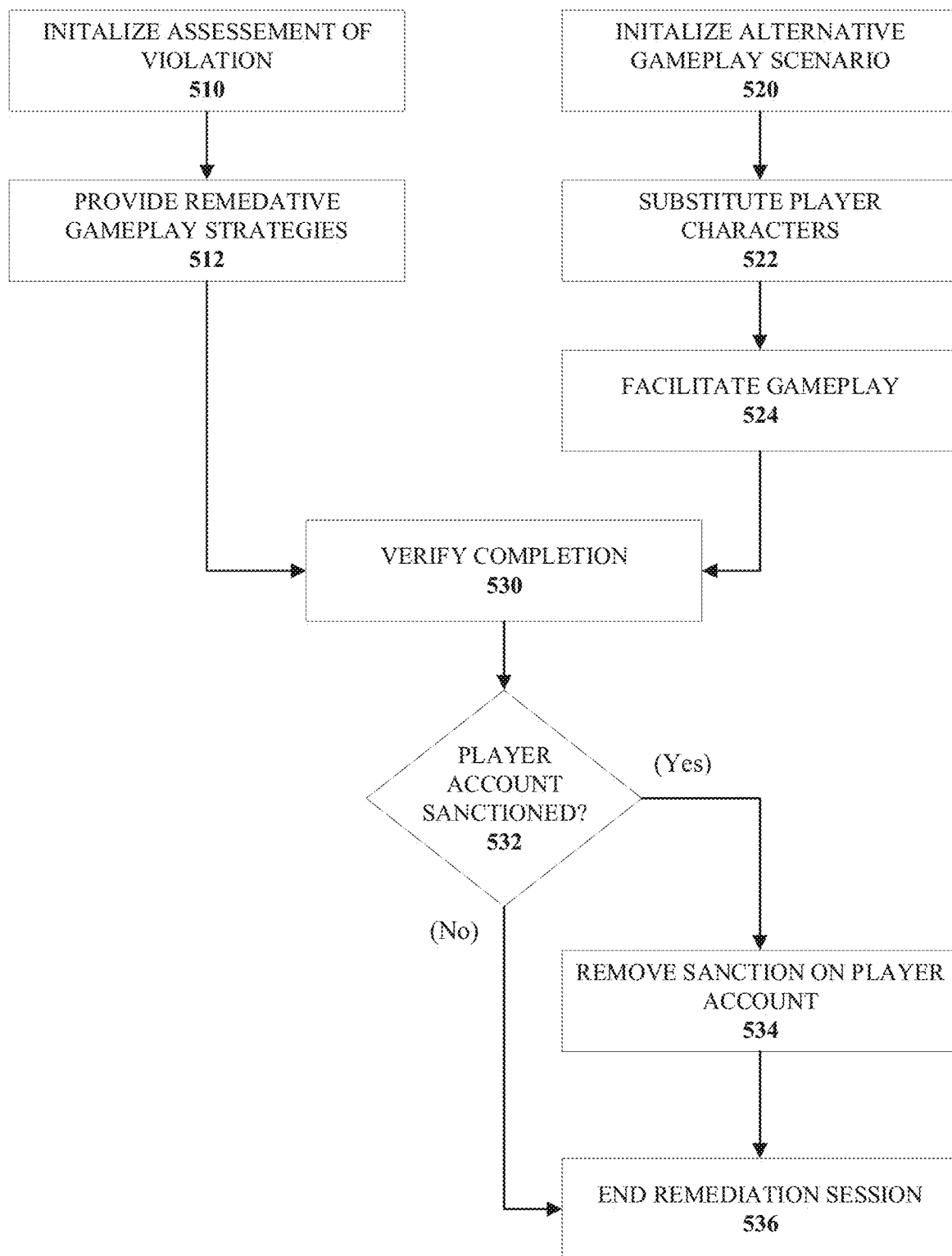
FIG. 5 illustrates an example embodiment of a system process facilitating a remediation session.

FIG. 5 illustrates an example embodiment of a process 500 for providing a remediation session. In some embodiments, process 500 represents game client 410 running remediation session 411 from remediation game state data 412 associated with player account 405. As described herein, the remediation game state data 412 is based at least in part on game state data 212 from gameplay session 211.

As illustrated in the example embodiment of FIG. 5, remediation can include an assessment process (e.g., steps 510 and 512) and/or execution of an alternative gameplay scenario (e.g., steps 520, 522 and 524). It should be understood that, in some embodiments, remediation can include both an assessment and an alternative gameplay scenario.

At step 510, the remediation session 411 performs an assessment of the violation as a remediation objective. In some embodiments, an assessment of the violation is an interactive guide that evaluates or assesses the impact, or the effect, the violation had over the course of gameplay session 211, including the impact or effect on other player accounts connected to gameplay session 211. For example, an assessment can evaluate one or more captures of game state data 212 of gameplay session 211 in which a violation had a negative impact or effect on the gameplay objective or the gameplay actions of one or more player characters associated with one or more player accounts.

At step 512, the assessment provides remedial gameplay strategies to improve upon or eliminate the situations causing or leading to the violation in gameplay session 211. In some embodiments, the remedial gameplay strategies are tips presented to player account 405 on game client 410— e.g., through user interface notifications, such as a text box, that displays during the remediation session 411. The remedial gameplay strategies can include, for example, methods for avoiding and/or improving upon misconduct.

At step 520, the remediation session 411 initializes an alternative gameplay scenario. In some embodiments, an alternative gameplay scenario is an altered re-creation of the gameplay session 211. For instance, the gameplay session 211 can be altered by creating remediation game state data 412 (e.g., based on or based off of the game state data 212) that includes a virtual interactive environment that enables player account 405 to experience the captured violation (e.g., as captured in the game state data 212 from which the remediation game state data 412 is derived). The virtual interactive environment enabled by the remediation game state data 412 can enable the player account 405, for example, to experience the violation from the same perspective (e.g., from the perspective of the same player character with which the player account 405 was associated with in gameplay session 211) or from a different perspective (e.g., from the perspective of a virtual player character different than the one the player account 405 was associated with during the session).

For example, upon accessing remediation session 411, player account 405 may, as part of the remediation objective, play as or view the gameplay from the player character associated with a different player account that was the subject (or victim) of misconduct in the original gameplay session 211. As such, player account 405 may participate in the remediation session 411 in the place of the other player character while experiencing the misconduct that they (player 405) committed in the original gameplay session 211. This enables the player associated with player account 405 to experience first-hand how their misconduct affected another player and/or the impact it had on the outcome of gameplay session 211. In some embodiments, remediation session 411 can provide player 405 some control of or interactivity with the other player character they are currently using or viewing from in the remediation session.

At step 522, the remediation session substitutes players characters with automated character agents where necessary to facilitate the alternative gameplay scenario.

At step 524, the remediation session facilitates or enables gameplay for the alternative gameplay scenario. In some embodiments, the alternative gameplay scenario of gameplay session 411 associates player account 405 with the player character associated with the player account that was victimized, offended or the like in, during or as a result of a violation in the gameplay session 211. In this way, the player account 405 (and thereby its user) can be exposed to and/or understand the experience of the victimized or offended player or player account. In some embodiments, the alternative gameplay scenario of remediation session 411 associates player account 405 as spectator to demonstrate an alternative outcome driven by the automated character agents.

In some embodiments, steps 520, 522 and 524, occur concurrently and/or independently of steps 510, 512, and 514, such that the remediation session 411 includes both remediation objectives from steps 510 and 520 occur. In some embodiments, only one remediation objective from steps 510 or 520 is included in remediation session 411 and occurs.

At step 530, completion of the remediation objective is verified. In some embodiments, verification in step 530 is done by game client 410. In some embodiments, verification in step 530 is done by gameplay services 420 (e.g., by a remediation service).

At step 532, a check is performed to determine whether the associated player account (405) received a sanction in response to the violation. If so (Yes), the system can remove the sanction on the player account 405 at step 534. In some embodiments, the sanction is removed by game client 410. In some embodiments, the sanction is removed by gameplay service 420. In turn, or if it was determined at step 532 that the player account had not been sanctioned (No), the remediation session 411 is ended at step 536.

Computing Device

Figure 6:
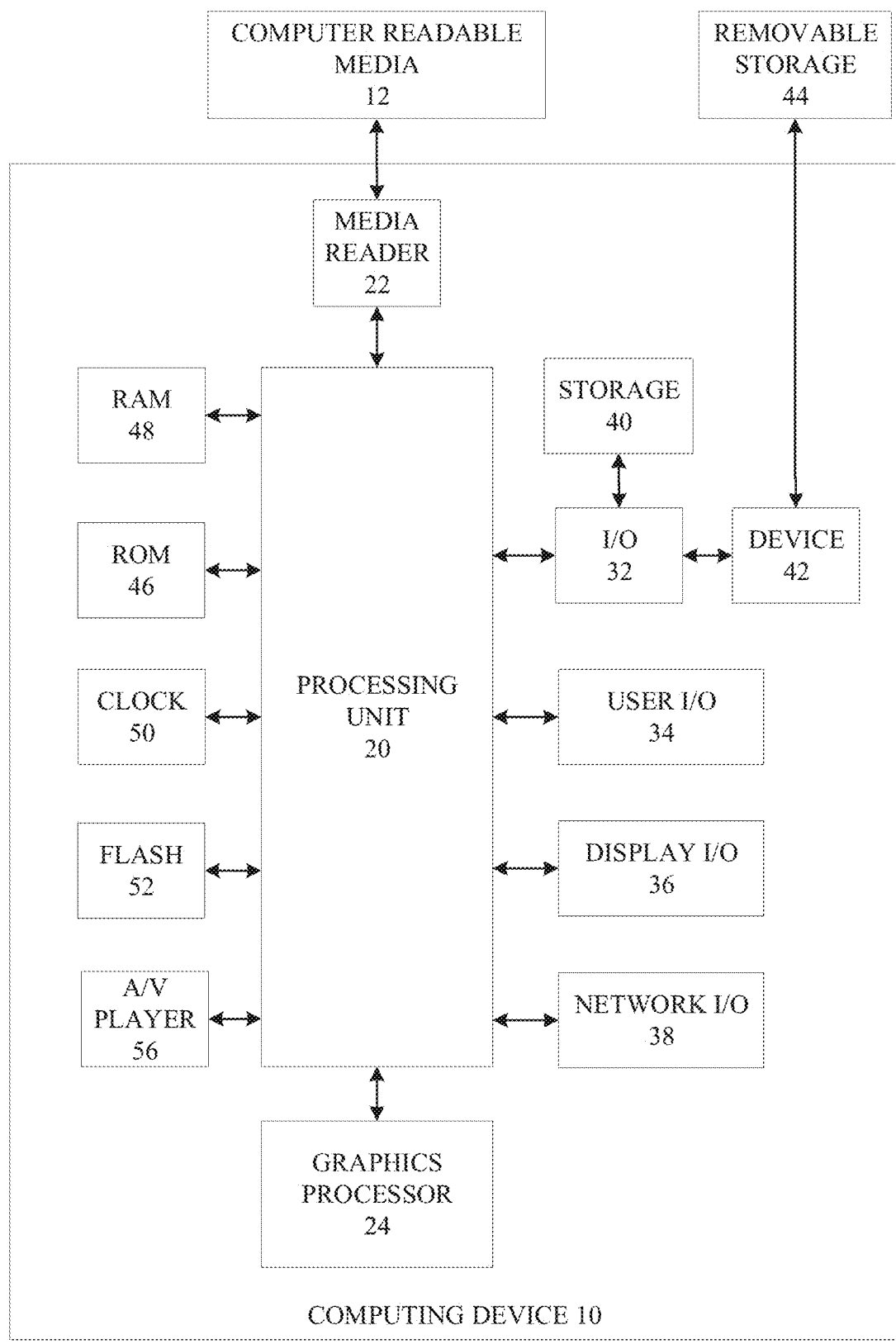
FIG. 6 illustrates an example embodiment of a computing device.

FIG. 6 illustrates an example embodiment of the resources within a computing device 10. In some embodiments, some or all of the computing devices 110 of FIG. 1 are similar to computing device 10, as known to those of skill in the art.

Other variations of the computing device 10 may be substituted for the examples explicitly presented herein, such as removing or adding components to the computing device 10. The computing device 10 may include a video game console, a smart phone, a tablet, a personal computer, a laptop, a smart television, a server, and the like.

As shown, the computing device 10 includes a processing unit 20 that interacts with other components of the computing device 10 and external components. A media reader 22 is included that communicates with computer readable media 12. The media reader 22 may be an optical disc reader capable of reading optical discs, such as DVDs or BDs, or any other type of reader that can receive and read data from computer readable media 12. One or more of the computing devices may be used to implement one or more of the systems disclosed herein.

Computing device 10 may include a graphics processor 24. In some embodiments, the graphics processor 24 is integrated into the processing unit 20, such that the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a video game console device, a general-purpose laptop or desktop computer, a smart phone, a tablet, a server, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data. In addition to storage 40 and removable storage media 44, computing device 10 is also shown including ROM (Read-Only Memory) 46 and RAM 48. RAM 48 may be used for data that is accessed frequently during execution of software.

User I/O 34 is used to send and receive commands between processing unit 20 and user devices, such as keyboards or game controllers. In some embodiments, the user I/O can include a touchscreen. The touchscreen can be a capacitive touchscreen, a resistive touchscreen, or other type of touchscreen technology that is configured to receive user input through tactile inputs from the user. Display I/O 36 provides input/output functions that are used to display images. Network I/O 38 is used for input/output functions for a network. Network I/O 38 may be used during execution, such as when a client is connecting to a server over a network.

Display output signals produced by display I/O 36 comprising signals for displaying visual content produced by computing device 10 on a display device, such as graphics, GUIs, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features, such as a clock 50, flash memory 52, and other components.

An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48, or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

Some portions of the detailed descriptions above are presented in terms of symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The disclosed subject matter also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The disclosed subject matter may be provided as a computer program product, or software, that may include a machine-readable medium having stored thereon instructions, which may be used to program a computer system (or other electronic devices) to perform a process according to the disclosed subject matter. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

Certain example embodiments are described above to provide an overall understanding of the principles of the structure, function, manufacture and use of the devices, systems, and methods described herein. One or more examples of these embodiments are illustrated in the accompanying drawings. Those skilled in the art will understand that the descriptions herein and the accompanying drawings are intended to be illustrative, and not restrictive. Many other implementations will be apparent to those of skill in the art based upon the above description. Such modifications and variations are intended to be included within the scope of the present disclosure. The scope of the present disclosure should, therefore, be considered with reference to the claims, along with the full scope of equivalents to which such claims are entitled. The features illustrated or described in connection with one exemplary embodiment may be combined with the features of other embodiments. In some instances, well-known structures and devices are shown in block diagram form, rather than in detail, in order to avoid obscuring the disclosed subject matter.

What is claimed:

1. A system comprising:
   one or more processors; and
   a computer-readable storage medium including machine-readable instructions that, when executed by the one or more processors, cause the one or more processors to:

connect a plurality of player characters to a gameplay session of a video game, wherein the gameplay session comprises game state data;
establish a policy, the policy comprising violations of interactivity among the plurality of player characters in the gameplay session, wherein a player account is associated with one or more player characters among the plurality of player characters;
monitor interactivity among the plurality of player characters in the gameplay session to detect violations of the policy by one or more of the plurality of player characters;
detect a violation by a first player character, wherein the first player character is associated with a first player account;
capture game state data of the gameplay session at a time when the violation occurs and at least one time proximate to when the violation occurs;
create remediation state data based in part on the captured game state data; provide, to the first player account, access to a remediation session, wherein the remediation session is a secondary gameplay session of the video game based in part on the remediation state data; and
determine completion of the remediation session by the first player account.

2. The system of claim 1, wherein the creating the remediation state data includes:
categorizing the violation by the first player character;
determining a remediation objective in response to the categorization, wherein the remediation objective is a gameplay objective that remediates the violation; and
providing instructions to:
(i) incorporate one or more automated character agents configured to direct gameplay actions of player characters over the course of the remediation session; and
(ii) incorporate the remediation objective.

3. The system of claim 2, wherein the determining the remediation objective occurs further in response to determining prior violations associated with the first player account.

4. The system of claim 3, wherein to provide access to a remediation session enables the first player account to initialize the remediation session as a secondary gameplay session of the video game, wherein the initialization references the remediation state data to:
(i) substitute a plurality of player characters with automated character agents; and
(ii) initialize the remediation objective, the remediation objective including at least one of:
(a) an assessment of the violation caused by the player character associated with the player account; and
(b) participation in an alternative gameplay scenario based in part on gameplay events in the gameplay session.

5. The system of claim 4, wherein the alternative gameplay scenario is driven by the automated character agents, the automated character agents configured to optimally control player characters in the completion of the remediation objective.

6. The system of claim 5, wherein the first player account is sanctioned in response to the detection of the violation, causing a sanction to be associated with the first player account.

7. The system of claim 6, wherein completion of the remediation session by the first player account removes the sanction on the player account.

8. A computer implemented method system to remediate violations of interactivity in video games by:
connecting a plurality of player characters to a gameplay session of a video game, wherein the gameplay session comprises game state data;
establishing a policy, the policy comprising violations of interactivity among the plurality of player characters in the gameplay session, wherein a player account is associated with one or more player characters among the plurality of player characters;
monitoring interactivity among the plurality of player characters in the gameplay session to detect violations of the policy by one or more of the plurality of player characters;
detecting a violation by a first player character, wherein the first player character is associated with a first player account;
capturing game state data of the gameplay session at a time when the violation occurs and at least one time proximate to when the violation occurs; creating remediation state data based in part on the captured game state data;
providing, to the first player account, access to a remediation session, wherein the remediation session is a secondary gameplay session of the video game based in part on the remediation state data; and
determining completion of the remediation session by the first player account.

9. The method of claim 8, wherein the creating the remediation state data includes:
categorizing the violation by the first player character;
determining a remediation objective in response to the categorization, wherein the remediation objective is a gameplay objective that remediates the violation; and
providing instructions to:
(i) incorporate one or more automated character agents configured to direct gameplay actions of player characters over the course of the remediation session; and
(ii) incorporate the remediation objective.

10. The method of claim 9, wherein the determining the remediation objective occurs further in response to determining prior violations associated with the first player account.

11. The method of claim 10, wherein to provide access to a remediation session enables the first player account to initialize the remediation session as a secondary gameplay session of the video game, wherein the initialization references the remediation state data to:
(i) substitute a plurality of player characters with automated character agents; and
(ii) initialize the remediation objective, the remediation objective including at least one of:
(a) an assessment of the violation caused by the player character associated with the player account; and
(b) participation in an alternative gameplay scenario based in part on gameplay events in the gameplay session.

12. The method of claim 11, wherein the alternative gameplay scenario is driven by the automated character agents, the automated character agents configured to optimally control player characters in the completion of the remediation objective.

13. The method of claim 12, wherein the first player account is sanctioned in response to the detection of the violation, causing a sanction to be associated with the first player account.

14. The method of claim 13, wherein completion of the remediation session by the first player account removes the sanction on the player account.

15. A non-transitory computer readable medium comprising machine-readable instructions to remediate violations of interactivity in video games by:
   connecting a plurality of player characters to a gameplay session of a video game, wherein the gameplay session comprises game state data;
   establishing a policy, the policy comprising violations of interactivity among the plurality of player characters in the gameplay session, wherein a player account is associated with one or more player characters among the plurality of player characters;
   monitoring interactivity among the plurality of player characters in the gameplay session to detect violations of the policy by one or more of the plurality of player characters;
   detecting a violation by a first player character, wherein the first player character is associated with a first player account;
   capturing game state data of the gameplay session at a time when the violation occurs and at least one time proximate to when the violation occurs;
   creating remediation state data based in part on the captured game state data;
   providing, to the first player account, access to a remediation session, wherein the remediation session is a secondary gameplay session of the video game based in part on the remediation state data; and
   determining completion of the remediation session by the first player account.

16. The non-transitory computer readable medium of claim 15, wherein the creating the remediation state data includes:
   categorizing the violation by the first player character;
   determining a remediation objective in response to the categorization, wherein the remediation objective is a gameplay objective that remediates the violation; and
   providing instructions to:
      (i) incorporate one or more automated character agents configured to direct gameplay actions of player characters over the course of the remediation session; and
      (ii) incorporate the remediation objective.

17. The non-transitory computer readable medium of claim 16, wherein the determining the remediation objective occurs further in response to determining prior violations associated with the first player account.

18. The non-transitory computer readable medium of claim 17, wherein to provide access to a remediation session enables the first player account to initialize the remediation session as a secondary gameplay session of the video game, wherein the initialization references the remediation state data to:
   (i) substitute a plurality of player characters with automated character agents; and
   (ii) initialize the remediation objective, the remediation objective including at least one of:
      (a) an assessment of the violation caused by the player character associated with the player account; and
      (b) participation in an alternative gameplay scenario based in part on gameplay events in the gameplay session.

19. The non-transitory computer readable medium of claim 18, wherein the alternative gameplay scenario is driven by the automated character agents, the automated character agents configured to optimally control player characters in the completion of the remediation objective.

20. The non-transitory computer readable medium of claim 19, wherein the secondary gameplay session is accessed in a second video game.

* * * * *